April 22, 1969  D. S. DENCE ET AL  3,439,766
HYDRAULIC-MOTOR-IN-WHEEL ASSEMBLY
Filed Dec. 29, 1966  Sheet 1 of 3

INVENTORS
DONALD S. DENCE
BARRY L. FROST
BY
Paul K. Gallagher
ATTORNEY

INVENTORS
DONALD S. DENCE
BARRY L. FROST
BY
Paul H Gallagher
ATTORNEY

United States Patent Office 3,439,766
Patented Apr. 22, 1969

3,439,766
HYDRAULIC-MOTOR-IN-WHEEL ASSEMBLY
Donald S. Dence, Lake Columbia, Brooklyn, and Barry
L. Frost, Jackson, Mich., assignors to Clark Equipment
Company, a corporation of Michigan
Filed Dec. 29, 1966, Ser. No. 605,800
Int. Cl. B60k 3/02
U.S. Cl. 180—66     12 Claims

ABSTRACT OF THE DISCLOSURE

Pistons arranged in-line axially in a central rotatable body, working against a fixed swash plate for rotating the body, planetary gearing between the body and wheel, and brake means having multiple radial plates surrounding the body and movable axially in braking and releasing directions, all within the confines of the wheel rim.

---

The present invention relates to a wheel assembly which includes a wheel and a hydraulic motor within the wheel. The wheel assembly is mounted on a vehicle having a power plant and hydraulic power lines for pumping liquid into the hydraulic motor and withdrawing it in a closed circuit, the power of the motor being derived from the pumped liquid.

A broad object of the present invention is to provide an assembly of the foregoing general character which includes a hydraulic motor within the wheel in an arrangement that is extremely compact and efficient.

An additional and more specific object is to provide a device of the foregoing character which includes a hydraulic motor having a central rotatable body and planetary gearing within the wheel interposed between the rotatable body and the wheel.

A still more specific object is to provide an assembly of the character just referred to in which the hydraulic motor includes a stationary swash plate, and the rotatable body carries a plurality of pistons arranged axially in-line, or parallel with the wheel axis, and working against the swash plate.

An additional object is to provide an assembly of the foregoing general character which includes a compact and effective brake means.

A still further and more specific object is to provide in a device of the foregoing general character, brake means mounted on the relatively high speed component of the motor wheel, whereby to render more effective and efficient braking action.

Other objects and advantages of the invention will appear from the following detail description taken in conjunction with the accompanying drawings wherein.

Figure 1:
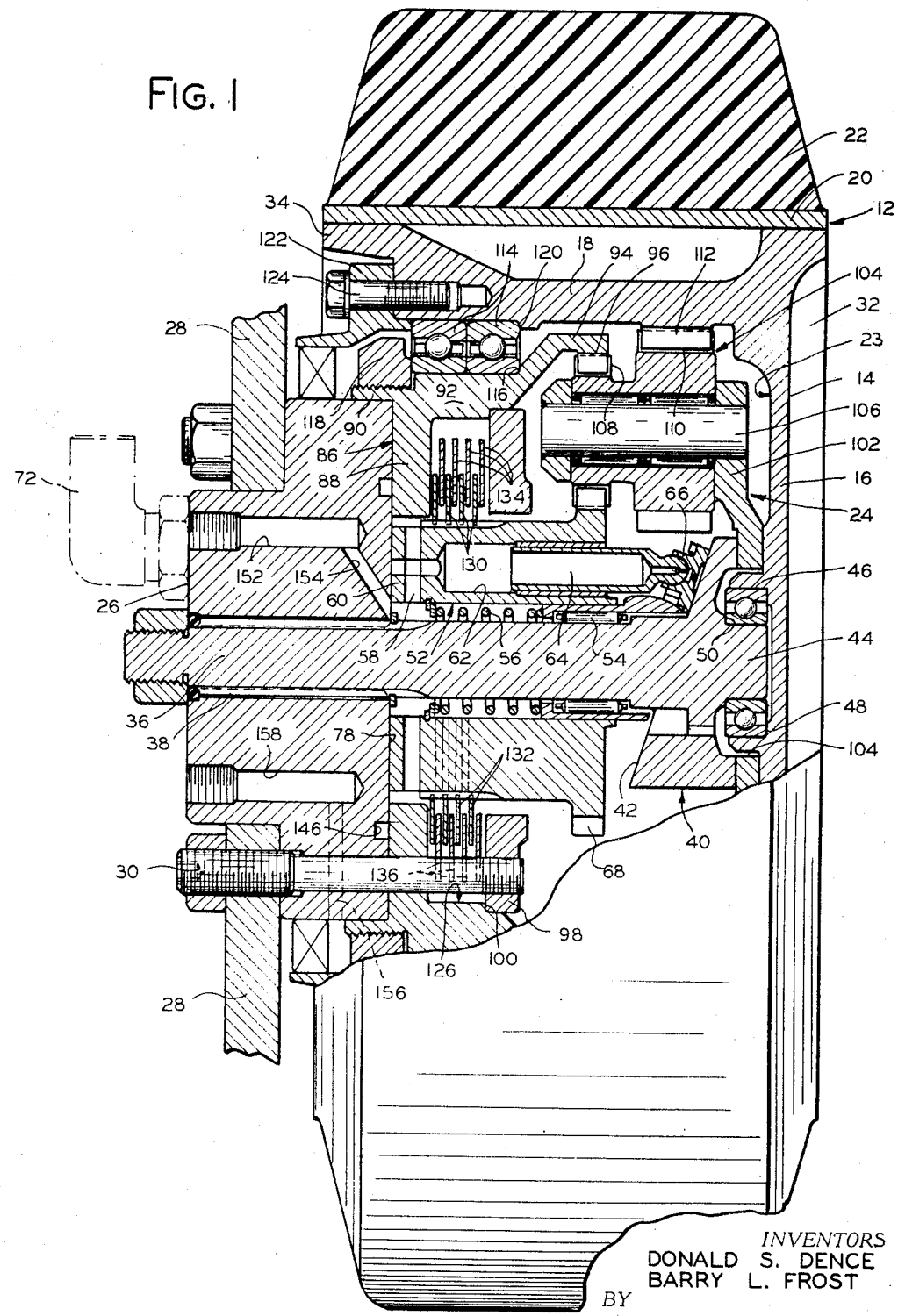
FIGURE 1 is a view principally in axial section, of the device of the invention, taken substantially at line 1—1 of FIGURE 2.

Referring now in detail to the drawings, attention is directed first to FIGURE 1 showing the wheel assembly or device in its entirety. The device includes a wheel 12 having an inner structural member 14 which includes a web 16 and a rim element 18. Mounted on this member is an outer rim 20 on which is secured a tire 22. The member 14 defines a cavity 23 opening axially and substantially containing all of the moving operating parts for driving the wheel, including a hydraulic motor 24 to be described in detail hereinbelow.

The assembly includes a block 26 which may also be termed a hub, mounted directly on elements 28 of the frame of the vehicle by suitable means such as machine screws 30. The wheel assembly as thus oriented has an outboard side 32 and an inboard side 34 relative to which various relations and positioning will be referred to respectively as outer and inner, for convenience.

Mounted in the hub 26 is a central shaft 36 fixed and stationarily secured as by splines 38, these two elements forming a central core. On the outer end of the shaft 36 is a swash plate 40 which may be integral with the shaft or separate element and fixedly secured thereto, the swash plate defining an inner inclined surface 42. The shaft has an outer terminal end element 44 having relative journalling relation to the wheel through an annular flange 46 and suitable bearings 48, the latter engaging a shoulder 50.

The hydraulic motor 24 includes a central body 52 rotatably mounted on the central shaft 36 by suitable bearings 54. A compression spring 56 initially biases the rotatable body against the hub 26, there being valving plates 58 and 60 interposed between the body and the hub which will be referred to again hereinbelow.

The body 52 is provided with a plurality of, in this case nine, cylinders 62 in which are mounted pistons 64 arranged in-line, or parallel with the wheel axis. The pistons 64 at their outer or extended ends are provided with heads 66 universally mounted thereon and engageable with the inclined surface 42 of the swash plate. The pistons 64 and the heads 66 may be of any desired and presently known detail construction. Formed on the rotatable body 52 is a gear element 68 which forms the sun gear of the planetary gearing utilized in driving the wheel.

Upon extension of the pistons 64 the heads 66 thereof "ride down" the swash plate and produce the rotation of the body 52, in a known manner, the hydraulic fluid being under pressure on the one side and withdrawn on the other.

Figure 2:
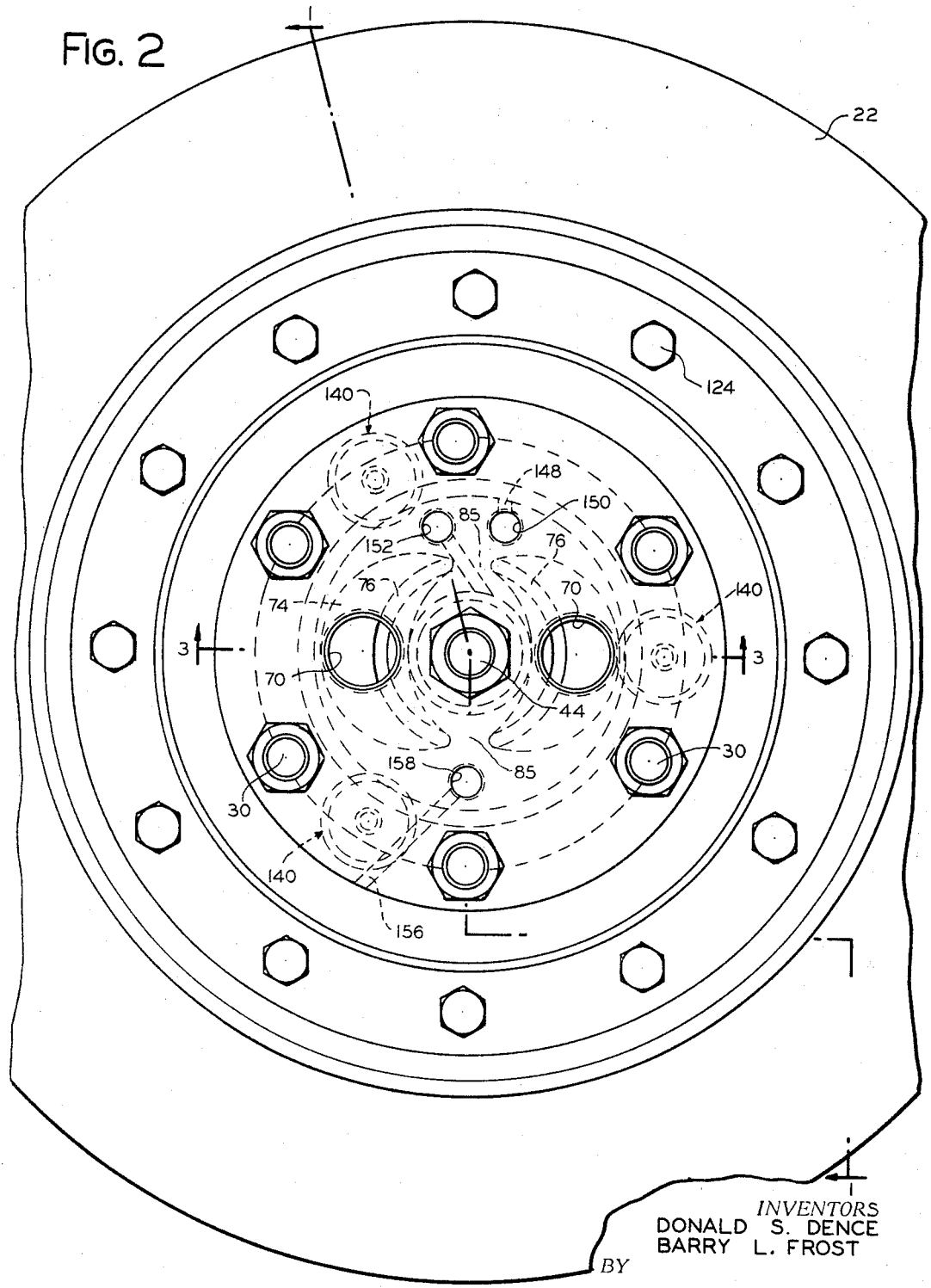
FIGURE 2 is a view taken from the left of FIGURE 1.
Figure 3:
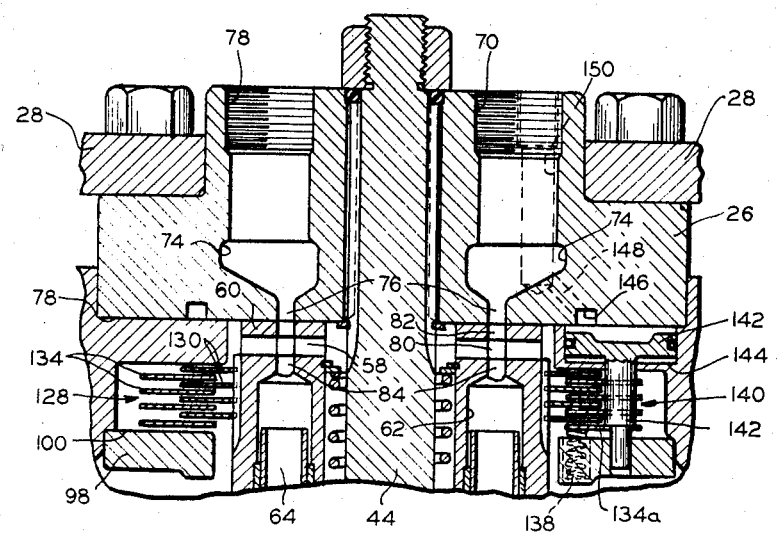
FIGURE 3 is an axial sectional view taken at line 3—3 of FIGURE 2.

The hub 26 is provided with passages for the flow of liquid to the cylinders, as shown in FIGURES 2 and 3. Ports 70 communicate through hydraulic power lines 72 with the power plant (not shown) in the vehicle. The ports lead to enlargements or chambers 74 which in turn lead to arcuate or circular ports 76 opening through the surface 78 of the hub.

Figure 4:
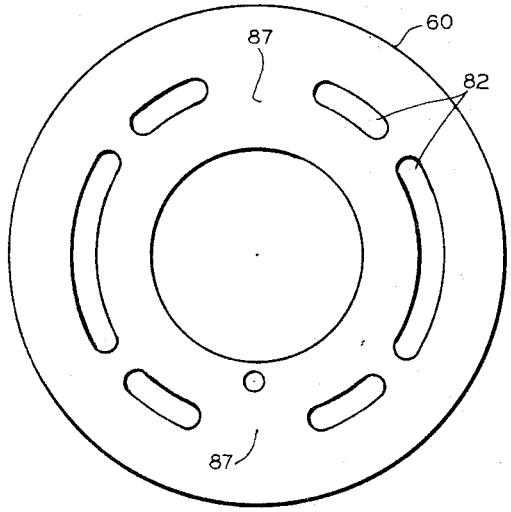
FIGURE 4 is a face view of one of the valving plates in the hydraulic motor.
Figure 5:
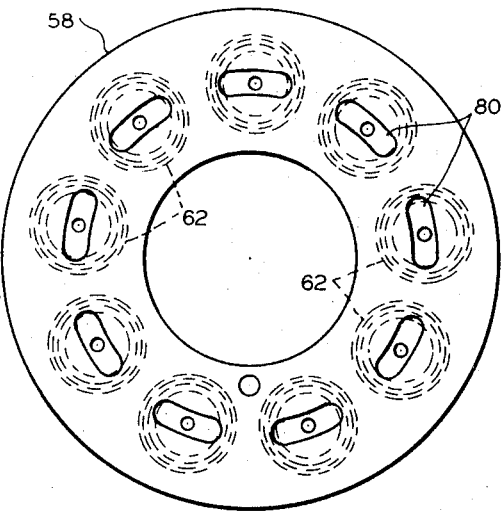
FIGURE 5 is a face view of another of the valving plates.

The valving plates 58 and 60 identified above are shown in face view in FIGURES 5 and 4 respectively. The plate 58 is secured to the rotatable body 52 while the plate 60 is secured to the support member 26. The plate 58 has a plurality of apertures or slots individual to the cylinders 62 and remaining in communication therewith, while the plate 60 is provided with apertures or slots 82 of different lengths. These apertures 80, 82 lie in a common circle with the apertures 76 and with other apertures 84 in the rotatable body 52 leading to the cylinders 62. These apertures may be disposed in any suitable and known arrangement for producing the progressive extension of the pistons, the apertures 76 being separated at their ends (FIGURE 2) as indicated at 85, with a similar arrangement of the apertures 82 in the plate 60 as indicated at 87. Upon pressure developed in either of the ports 70, the pistons on the corresponding side are extended while those on the opposite side are retracted, these two sides being on the respective sides of the inclined surface 42 of the swash plate while the pistons at the ends are cut off from the pressure at the high point and low point of the swash plate. This arrangement per se is known and therefore it is not believed necessary to further describe the details thereof. However, the positioning of the pistons in the in-line arrangement is novel in the present invention.

The hydraulic motor 24 is operable in either direction, the ports 70 being selectively pressurized according to the desired direction of rotation of the wheel. The various operating parts are all symmetrical including the aperture in the valving plates 58 and 60 (FIGURES 4 and 5), the rotatable body 52 and the pistons therein, the swash plate, and the planetary gearing.

Mounted on the hub 26 is a support member 86 having an annular portion 88 fitted to the surface 78 of the hub and an axial flange 90 surrounding the hub. This member 86 also includes an annular axially extending element 92 which leads into a bell-shaped flange 94 on which is formed a ring gear 96. A ring 98 (FIGURE 1, bottom) is fitted against a shoulder 100 on the support member 86 and the machine screws 30 extend through the annular portion 88 of the member 84 and the ring 98, and secure the latter two elements in rigid assembly, and together in assembly with the hub 26.

Adjacent the web 16 of the wheel is a planet gear carrier 102 of generally plate-like construction having a central opening 104 receiving the flange 46 of the web, the marginal edge portion defining that opening being supported in a running fit between the swash plate and the web for rotation therebetween. A plurality of planet gears 104 are rotatably mounted on pins 106 mounted in the carrier 102, each gear having gear elements 108 and 110 of different radii, the gear element 108 meshing with the sun gear 68 and with the ring gear 96 on the member 86, while the other gear element 110 meshes with a ring gear 112 on the rim element 18.

The inner portion of the rim element 18 is supported by suitable bearings 114 on the support member 86, the bearings being gripped between a shoulder 116 on the support member and a ring nut 118 threaded on the flange 90. The rim element 18 also has a shoulder 120 engaging the bearings 114 and this shoulder receives the inward thrust of the wheel, that thrust being transmitted through the bearings 114 to the ring nut 118. Securement against outward movement is provided by a ring 122 secured to the wheel as by machine screws 124, the outward thrust being transmitted through the ring 122 to the bearings 114 and the shoulder 116 in the support member 86. The radial support through the bearing 114 extends a substantial distance axially on both the rim element 18 and the support member 86 and the location of this support is displaced axially from the radial support through the bearing 48. Suitable sealing means 126 may be provided between the ring 122 and the hub 26.

Between the ring 98 and the annular portion 88 of the member 86 is a space 126 in which is disposed a brake means 128 which includes a plurality of annular plates 130 surrounding the rotatable body 52 and fixed thereto for rotation therewith as by keying at 132, although being movable axially therealong. Interleaved with the plates 130 are other plates 134 having notches in their outer periphery receiving the machine screws 30 at 136 and thus held against rotation around the wheel axis although being movable axially relative thereto. These plates are urged into friction interengagement for applying a braking action, by compression springs 138 in the ring 98. They are moved out of braking engagement by pistons 140 having rods 142 engaging the outer one 134a of the plates 134. The pistons have heads 142 operating in cylinders 144 in the annular portion 88 of the member 86.

Communicating with the cylinders 144 is a circumferential port or grove 146 in the surface 78 of the hub 26. Communicating with this port 146 is a passage 148 which in turn communicates with a passage 150 leading through the hub where it is connected with a suitable hydraulic line (not shown) and operative upon pressurizing the liquid therein for extending the pistons 140 and releasing the brake means. Upon relief of the pressure in such line, the brakes are applied by springs 138.

Suitable lubrication to the interior of the assembly may be provided by a passage 152 in the hub 26 which leads to another passage 154 opening through the surface 78 of the hub. Lubricating liquid may be pumped therethrough into the interior of the assembly by suitable means (not shown) and returned through another passage 156 communicating with an outlet passage 158.

The device provides an extremely compact arrangement of hydraulic motor 24 with the pistons arranged axially in-line, and a compact and effective arrangement of the planetary gearing between the central rotatable body 52 and the rim element 18. Additionally the brake means 128 is arranged in a compact manner, and furthermore the braking action is applied directly to the rotatable body 52 which is the fastest moving component in the chain of drive leading to the wheel, whereby greater effective and efficient braking action is attained. The stationary swash plate 40 is mounted effectively on the fixed hub 26, facilitating its mounting and the movement relative thereto of the other components of the chain of drive.

We claim:

1. A hydraulic motor driven wheel assembly comprising a rigid and effectively unitary central core including a hub by which the assembly is mounted on a vehicle and a shaft extending from the hub with a swash plate on its extended end having an inclined surface directed toward the hub, a wheel member mounted on the central core coaxially therewith and having bearing support thereon at axially spaced points adjacent the axial limits of the wheel member, a central body mounted on the central core and surrounding the shaft, pistons in the central body distributed around and parallel with the axis of the central core and working on the swash plate, one of the two members (a) the swash plate, (b) the central body, being rotatable and the pistons being operative for rotating it, the device including hydraulic passages for communication with hydraulic power lines for operating the pistons, and planetary gearing surrounding the shaft and central body and operatively interposed between the rotatable member and the wheel member.

2. The invention set out in claim 1 wherein the swash plate is stationary, and the central body is rotatable.

3. The invention set out in claim 2 wherein the hub and shaft are stationary and the swash plate is fixed to the shaft, the central body immediately and closely surrounds the shaft, and the central body, including the pistons, reacts axially between the swash plate and the hub and the pistons are contained with the circumferential limits of the swash plate.

4. The invention set out in claim 1 wherein the points of bearing support of the wheel member on the central core are respectively on the extended end of the shaft and on the hub.

5. The invention set out in claim 1 and including brake means having interleaved plate elements respectively mounted on the movable one of said members and effectively on a fixed element of the central hub and relatively movable axially in oppostie directions for friction interengagement and release, spring means for moving the plates in one direction, and means responsive to fluid pressure for moving them in the opposite direction.

6. The invention set out in claim 5 wherein said central body is rotatable and rotates at a faster rate than the planetary gearing and wheel member, and the movable plates of the brake means are secured to said central body for rotation therewith.

7. A hydraulic motor driven wheel assembly comprising, a stationary central core including a hub, a wheel member rotatably mounted on the central core on a common axis, means on the core forming a swash plate, a central body mounted on the core, pistons in the central body distributed around and parallel with said axis working on the swash plate, one of the two members (a) the swash plate, (b) the central body, being rotatable and the pistons being operative for rotating it, means mounted on the hub forming a fiixed ring gear internally of the wheel member, the wheel member including a rim element with a second ring gear element, a sun gear on the movable one of said members, a planet gear carrier rotatably positioned internally of the wheel and having planet gears thereon meshing with said sun gear and said ring gears, the device including hydraulic passages for communication with hydraulic power lines for operating the pistons, said planetary gearing being operatively interconnected between the rotatable member and the wheel member.

8. The invention set out in claim 7 wherein the central body is rotatable and includes said sun gear thereon, and brake means is disposed generally axially beyond the planet gears, and both the planet gears and brake means are within the interior of the wheel.

9. A hydraulic motor wheel assembly comprising, a wheel member having a web adjacent one side and a rim element extending axially therefrom defining a central cavity opening axially from one side of the wheel member, a stationary central core including a hub by which the device is mounted on a vehicle and a central shaft fixedly mounted in the hub, the hub being disposed adjacent the open side of the cavity and the shaft extending into the cavity and having relative journalling support in said web, means on the central shaft adjacent said web forming a swash plate having an inclined surface directed generally toward said hub, a central body rotatably mounted on said shaft between the swash plate and the hub and having a plurality of pistons therein distributed around and parallel with the wheel axis, the pistons working against said swash plate and the body reacting thereto against the hub, the hub having hydraulic passages therethrough for communication with hydraulic power lines for operating the pistons, valving means for controlling the flow of hydraulic fluid into and from the pistons, the pistons upon actuation thereof axially being operative for rotating the central body, the central body having a sun gear thereon, a planet gear carrier of generally platelike form having a central aperture receiving the connecting elements between the central shaft and wheel web and rotatably disposed between the swash plate and the wheel web, planet gears on the planet gear carrier, a ring gear on said rim element, a support member fixedly mounted on said hub and having an axially extending flange adjacent to said rim element and having a second ring gear thereon axially adjacent to the first ring gear but of different diameter therefrom, the planet gears having axially spaced gear elements thereon one of which meshes with the sun gear and with the second ring gear and the other of which meshes with the first ring gear.

10. The invention set out in claim 9 wherein said support member has a transverse annular portion fitted to the hub and a generally open bell shape axial extension on which the second ring gear is formed and forming a generally hollow interior, the device also including a ring secured in the support member in spaced relation to said transverse annular portion, and brake means is provided in the space between said ring and said transverse annular portion, said brake means including a plurality of annular interleaved plates certain ones of which are secured to the central body member for rotation therewith and others of which are secured against rotation and all having limited axial movement, spring means in said ring urging the plates axially into friction interengagement, and piston means in said support member for releasing the pressure provided by the springs, and the hub having hydraulic passages for communication with hydraulic power lines for operating said brake piston means.

11. The invention set out in claim 10 wherein said support member has an exterior circumferential surface of substantial axial extent and bearing means is interposed between that surface and a surface of said rim element throughout said axial extent.

12. The invention set out in claim 11 wherein bearing intersupport between the wheel and stationary central core is through said bearing means and through the relative journalling interconnection between the extended end of the central shaft and the wheel web.

References Cited
UNITED STATES PATENTS

| | | | |
|---|---|---|---|
| 2,340,169 | 1/1944 | Arndt | 91—198 X |
| 2,353,730 | 7/1944 | Joy | 180—66 |
| 2,357,742 | 9/1944 | Jeffrey | 180—66 X |
| 2,729,298 | 1/1956 | LeTourneau | 180—60 |
| 3,124,079 | 3/1964 | Boyer | 103—162 |
| 3,192,868 | 7/1956 | Wahlmark. | |

LEO FRIAGLIA, *Primary Examiner.*

MILTON L. SMITH, *Assistant Examiner.*

U.S. Cl. X.R.

91—198